US010884431B2

(12) United States Patent
Dickens et al.

(10) Patent No.: US 10,884,431 B2
(45) Date of Patent: Jan. 5, 2021

(54) LIMITED DESTINATION AUTOMATIC GROUND SERVICES TRANSPORTATION SYSTEM

(71) Applicant: International Business Machines Corporation, Armonk, NY (US)

(72) Inventors: Louie A. Dickens, Tucson, AZ (US); Tara Astigarraga, Fairport, NY (US); Christopher DeRobertis, Hopewell Junction, NY (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 16/053,561

(22) Filed: Aug. 2, 2018

(65) Prior Publication Data

US 2020/0042015 A1 Feb. 6, 2020

(51) Int. Cl.
*G05D 1/02* (2020.01)
*G01C 21/34* (2006.01)
*H04N 7/18* (2006.01)
*G06Q 10/06* (2012.01)
*G06K 9/00* (2006.01)
*G01C 21/20* (2006.01)

(52) U.S. Cl.
CPC .......... *G05D 1/0291* (2013.01); *G01C 21/20* (2013.01); *G01C 21/34* (2013.01); *G06K 9/00838* (2013.01); *G06Q 10/06311* (2013.01); *H04N 7/18* (2013.01)

(58) Field of Classification Search
CPC .............................. G05D 1/0291; G01C 21/34
See application file for complete search history.

(56) References Cited

U.S. PATENT DOCUMENTS

| 8,626,565 | B2 | 1/2014 | Petroff |
| 9,441,981 | B2 | 9/2016 | Abhyanker |
| 9,613,386 | B1 | 4/2017 | Arden et al. |

(Continued)

FOREIGN PATENT DOCUMENTS

JP 2003168193 A * 6/2003

OTHER PUBLICATIONS

Asad Syed, "Automatic Passenger Counting for Bus and Train", Retail Sensing, http://www.retailsensing.com/automated-passenger-counting.html, Apr. 19, 2017, pp. 1-3.

(Continued)

*Primary Examiner* — Anne Marie Antonucci
*Assistant Examiner* — Abdalla A Khaled
(74) *Attorney, Agent, or Firm* — Kunzler Bean & Adamson

(57) ABSTRACT

An apparatus for includes a detection module, determination module, dispatch module, and notification module. The detection module detects at least one rider at a pickup location. The determination module determines a qualifying automated guided vehicle of a fleet of automated guided vehicles based on at least one of distance to the pickup location, passenger capacity, or vehicle type. The dispatch module dispatches the qualifying automated guided vehicle of the fleet of automated guided vehicles in response to the detection module detecting the at least one rider at the pickup location. The notification module notifies of delivery of the at least one rider to a destination location.

20 Claims, 5 Drawing Sheets

(56) References Cited

U.S. PATENT DOCUMENTS

| | | | |
|---|---|---|---|
| 9,733,096 | B2 | 8/2017 | Colijn et al. |
| 9,805,605 | B2* | 10/2017 | Ramanujam ........... G08G 1/202 |
| 2016/0209220 | A1 | 7/2016 | Laetz |
| 2017/0219362 | A1 | 8/2017 | Bryson et al. |
| 2018/0053412 | A1* | 2/2018 | Iagnemma ............. G08G 1/005 |
| 2019/0126766 | A1* | 5/2019 | Taguchi .................. B60L 53/36 |

OTHER PUBLICATIONS

J. Miller et al., "Demand Estimation and Chance-Constrained Fleet Management for Ride Hailing", arXiv.org, https://arxiv.org/abs/1703.02130, Jul. 22, 2017, pp. 1-9.

D.J. Fagnant et al., "Dynamic Ride-Sharing and Fleet Sizing for a System of Shared Autonomous Vehicles in Austin, Texas", Transportation 45:, 2016, pp. 1-17.

A. Scheltes et al., "Exploring the use of automated vehicles as last mile connection of train trips through an agent-based simulation model: An application to Delft, Netherlands", ScienceDirect, International Journal of Transportation Science and Technology, 2017, pp. 28-41.

B. Van Meldert, "Introducing autonomous vehicles in logistics: a review from a broad perspective", Ku Leuven Faculty of Economics and Business, 2016, pp. 1-42.

T. Oransirikul et al., "Measuring bus passenger load by monitoring Wi-Fi transmissions from mobile devices", ScienceDirect, International Workshop on Innovations in Information and Communication Science and Technology, IICST 2014, Sep. 3-5, 2014, Warsaw, Poland, pp. 120-125.

J. Alonso-Mora et al., "On-demand high-capacity ride-sharing via dynamic trip-vehicle assignment", PNAS, vol. 114, No. 3, Jan. 17, 2017, pp. 462-467.

B. Rebsamen et al., "Utilizing the Infrastructure to Assist Autonomous Vehicles in a Mobility on Demand Context", Proc. IEEE Tencon, Nov. 19-22, 2012, pp. 1-5.

* cited by examiner

LIMITED DESTINATION AUTOMATIC GROUND SERVICES TRANSPORTATION SYSTEM

FIELD

The subject matter disclosed herein relates to systems for transporting goods and people and more particularly relates to the use of automated guided vehicles to provide on-demand transportation.

BACKGROUND

While autonomous vehicles are beginning to transition onto public roads and likely will continue to be increasingly adopted by the market, there is disagreement on the level of automation that will be present in the coming decade(s). What is needed are systems and processes to better transition towards fully autonomous vehicles.

BRIEF SUMMARY

An apparatus is disclosed, the apparatus including a detection module, determination module, dispatch module, and notification module. The detection module detects at least one rider at a pickup location. The determination module determines a qualifying automated guided vehicle of a fleet of automated guided vehicles based on at least one of distance to the pickup location, passenger capacity, or vehicle type. The dispatch module dispatches the qualifying automated guided vehicle of the fleet of automated guided vehicles in response to the detection module detecting the at least one rider at the pickup location. The notification module notifies of delivery of the at least one rider to a destination location.

A method is disclosed. The method includes detecting at least one rider at a pickup location, and determining a qualifying automated guided vehicle of a fleet of automated guided vehicles based on at least one of distance to the pickup location, passenger capacity, or vehicle type. The method further includes dispatching the qualifying automated guided vehicle of the fleet of automated guided vehicles in response to the detection module detecting the at least one rider at the pickup location and notifying of delivery of the at least one rider to a destination location.

A computer program product is disclosed, the computer program product including a computer-readable storage medium including program instructions embodied therewith, the program instructions executable by a processor to cause the processor to detect at least one rider at a pickup location, determine a qualifying automated guided vehicle of a fleet of automated guided vehicles based on at least one of distance to the pickup location, passenger capacity, or vehicle type, dispatch the qualifying automated guided vehicle of the fleet of automated guided vehicles in response to the detection module detecting the at least one rider at the pickup location, and notify of delivery of the at least one rider to a destination location.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
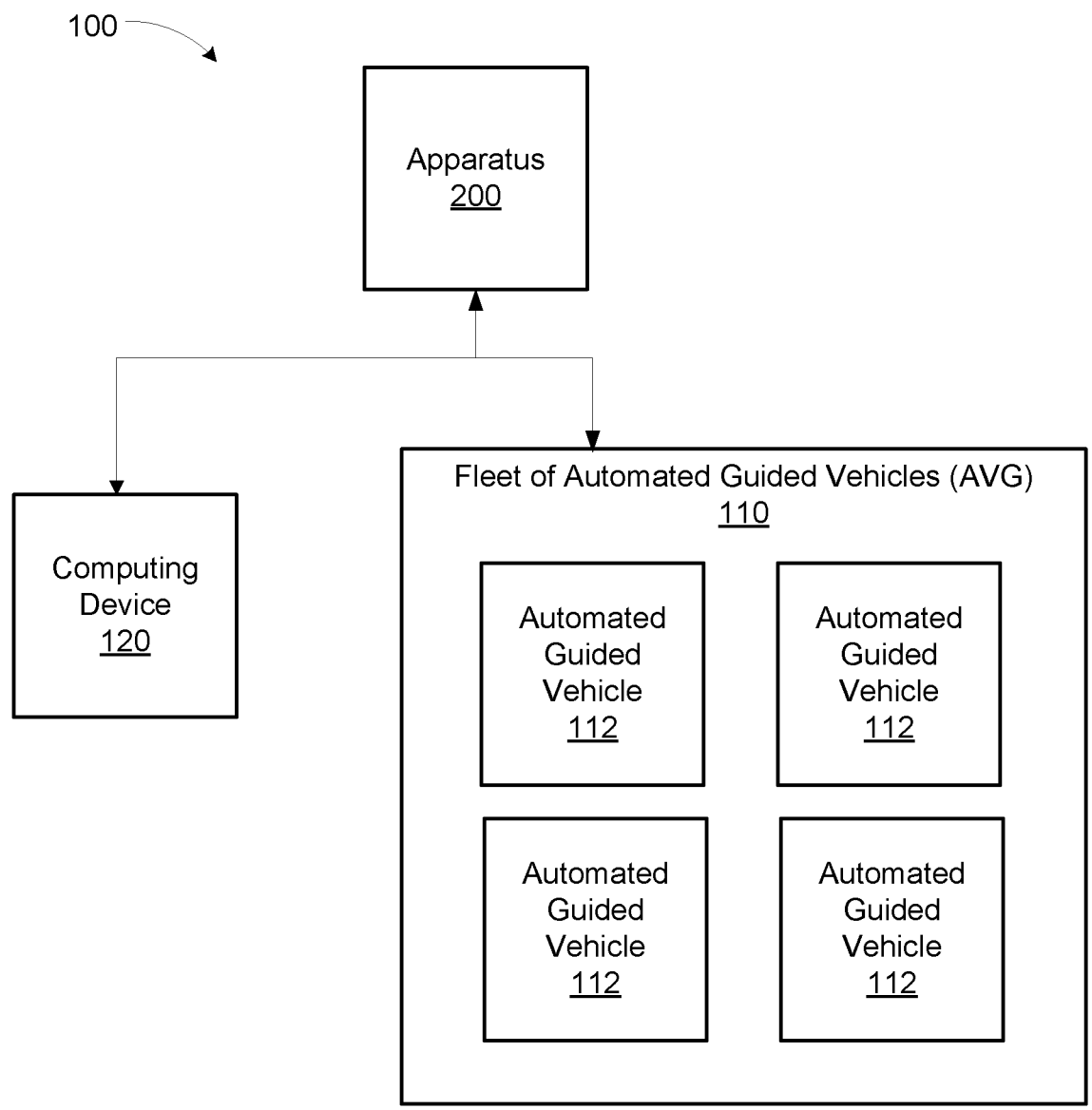
FIG. 1 is a schematic block diagram illustrating a system in accordance with one or more embodiments of the present invention.

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The present invention may be a system, a method, and/or a computer program product. The computer program product may include a computer readable storage medium (or media) having computer readable program instructions thereon for causing a processor to carry out aspects of the present invention.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The subject matter of the present application has been developed in response to the present state of the art, and in particular, in response to the problems and disadvantages associated with the present state of the art. Accordingly an apparatus is disclosed, the apparatus including a detection module, determination module, dispatch module, and notification module. The detection module detects at least one rider at a pickup location. The determination module determines a qualifying automated guided vehicle of a fleet of automated guided vehicles based on at least one of distance to the pickup location, passenger capacity, or vehicle type. The dispatch module dispatches the qualifying automated guided vehicle of the fleet of automated guided vehicles in response to the detection module detecting the at least one rider at the pickup location. The notification module notifies of delivery of the at least one rider to a destination location.

In some embodiments, the apparatus further includes a monitor module that monitors a service availability of each automated guided vehicle of the fleet of automated guided vehicles.

In some embodiments, the apparatus further includes a monitor module that monitors a current location of each automated guided vehicle of the fleet of automated guided vehicles.

In some embodiments, the fleet of automated guided vehicles includes a plurality of automated guided vehicles with different passenger capacities and vehicle types.

In some embodiments, the notification module further notifies of a service availability of the qualifying automated guided vehicle in response to delivery of the at least one rider to the destination location.

In some embodiments, the notification module further notifies of a service unavailability of the qualifying automated guided vehicle in response to a low battery state of the qualifying automated guided vehicle.

In some embodiments, the determination module further determines a plurality of routes available from the pickup location to a destination location, and wherein the routes have road sensors embedded in the plurality of routes.

In some embodiments, the detection module further detects a number of passengers to be transported by one of video monitoring, automatic detection, or notification of the rider.

In some embodiments, the pickup location is a designated area and wherein the detection module further detects the at least one rider by activation of a call button at the designated area.

In some embodiments, the detection module further detects the riders by receiving a notification from the rider, wherein the notification includes the pickup location.

In some embodiments, the pickup location is a designated area and wherein the detection module further detects the riders by video monitoring of the designated area.

A method is disclosed. The method includes detecting at least one rider at a pickup location, and determining a qualifying automated guided vehicle of a fleet of automated guided vehicles based on at least one of distance to the pickup location, passenger capacity, or vehicle type. The method further includes dispatching the qualifying automated guided vehicle of the fleet of automated guided vehicles in response to the detection module detecting the at least one rider at the pickup location and notifying of delivery of the at least one rider to a destination location.

In some embodiments, the method further includes monitoring a service availability of each automated guided vehicle of the fleet of automated guided vehicles and a current location of each automated guided vehicle of the fleet of automated guided vehicles In some embodiments, the fleet of automated guided vehicles comprises a plurality of automated guided vehicles with different passenger capacities and vehicle types.

In some embodiments, the method further includes notifying of a service availability of the qualifying automated guided vehicle in response to delivery of the at least one rider to the destination location.

In some embodiments, the method further includes notifying of a service unavailability of the qualifying automated guided vehicle in response to a low battery state of the qualifying automated guided vehicle.

In some embodiments, the method further includes determining a plurality of routes available from the pickup location to a destination location, and wherein the routes have road sensors embedded in the plurality of routes.

In some embodiments, the method further includes detecting a number of passengers to be transported by one of video monitoring, automatic detection, or notification of the rider.

A computer program product is disclosed, the computer program product including a computer-readable storage medium including program instructions embodied therewith, the program instructions executable by a processor to cause the processor to detect at least one rider at a pickup location, determine a qualifying automated guided vehicle of a fleet of automated guided vehicles based on at least one of distance to the pickup location, passenger capacity, or vehicle type, dispatch the qualifying automated guided vehicle of the fleet of automated guided vehicles in response to the detection module detecting the at least one rider at the pickup location, and notify of delivery of the at least one rider to a destination location.

In some embodiments, the program instructions further cause the processor to notify of a service unavailability of the qualifying automated guided vehicle in response to a low battery state of the qualifying automated guided vehicle.

The description of elements in each figure may refer to elements of proceeding figures. Like numbers refer to like elements in all figures, including alternate embodiments of like elements.

With reference now to the figures, FIG. 1 shows an exemplary system 100 that is applicable to implement some embodiments of the present disclosure. System 100 is only illustrative and is not intended to suggest any limitation as to the scope of use or functionality of embodiments of the disclosure described herein. In FIG. 1, the system 100 includes a fleet of automated guided vehicles 110. The fleet of automated guided vehicles 110 includes a plurality of automated guided vehicles (AGVs) 112. The AGVs 112 are used to transport goods and people. In some embodiments, the automated guided vehicles 112 are utilized in system 100 as an on-demand method of transporting the goods and people. The goods and people may be picked up from identifiable locations or pre-designated locations along a pre-defined route.

The fleet of automated guided vehicles 110 includes a plurality of automated guided vehicles (AGVs) that includes a range of sizes, passenger capacities, and cargo capacities. That is, the fleet of automated guided vehicles 110 may include a range of AGV's 112 that have passenger capacities for one person, two persons, and up to dozens of persons. The system 100 may be configured to dispatch a vehicle with a passenger capacity at or above the on-demand need of the riders. That is, the system 100, upon registering a need for transporting three passengers may be configured to dispatch any AGV 112 that includes a passenger capacity of three or greater. In some embodiments, the system 100 may be configured to dispatch more than one AGV 112 to accommodate the number of passengers. For example, where eight passengers are registered as needing transport, the system 100 may be configured to dispatch two AGVs 112 each with a passenger capacity of four to satisfy the needs present.

In addition, the system 100 may accommodate other constraints which may include, but are not limited to, wheelchair accessibility, baggage or cargo needs, strollers, child restraints, pet accessibility, etc. Known constraints communicated to the system 100 may be accommodated by dispatching an automated guided vehicle 112 that qualifies for satisfying the constraints.

In addition to cargo and passenger capacities, the system 100 may analyze other constraints. In some embodiments, after determining a plurality of AGVs 112 that satisfy the constraints, the system 100 may be configured to dispatch the closest available AGV 112 to a pickup location. In some embodiments, the system 100 is configured to dispatch the closest available AGV 112.

Currently there is a vast amount of work going into creating safe and functional self driving cars and vehicles but many technological challenges and challenges in implementation with traditional vehicles limits the widespread adoption of self driving vehicles. Automated guided vehicles 112, however, have been utilized in limited situations while employing navigation, steering control, traffic control and other systems to navigate confined areas. They are utilized in industrial applications to move materials and product around manufacturing facilities and warehouses. Embodiments described herein merge automated guided vehicles 112 and autonomous driving technology into a single technology. Some embodiments provide an on-demand method of transporting goods and people on public roadways.

In some embodiments, the AGVs 112 are guided by sensors in or along a roadway. The AGVs 112 may be configured to follow markers or wires in or near roadways. In some embodiments, the AGVs 112 are configured to utilize vision systems, magnets or lasers for navigation. In some embodiments, the AGVs 112 are controlled detection of a radio signal or other signals that indicate a relative position from the transmitting device.

In some embodiments, the AGVs 112 include a stop-and-wait until signaled sensor. The stop-and-wait until signaled sensor may be configured to allow the AGVs 112 to operate in expanded areas that include traditional driving vehicles. In some embodiments, the -and-wait until signaled sensor notifies the AGV 112 to stop and wait until directed by a computer or another signal to proceed. In some embodiments, the -and-wait until signaled sensor is utilized at stop lights, cross walks, pick up locations and drop off locations, etc.

In some embodiments, the AGVs 112 include cameras and motion sensors. In some embodiments, the cameras and motion sensors are configured to ensure that the AGVs 112 are safe to move. The cameras and motion sensors may be configured to retrieve data after loading or unloading people or goods. In some embodiments, the cameras and motion sensors are embedded into the AGVs 112. In some embodiments, the cameras and motion sensors are monitored by software/firmware associated with the sensors.

In some embodiments, the AGVs 112 include a messaging system. In some embodiments, the riders of the AGVs 112 may need to communicate with the AGV 112 or the AGV 112 may need to communicate with the riders. As an example, the AGV 112 may be in process of final boarding and may communicate information to the riders. In some embodiments, the AGV 112 audibly communicates information to the riders. As an example, the AGV 112 may be approaching a stop and may audibly indicate for the riders to hold on.

In some embodiments, the AGVs 112 include additional features found on cars and vehicles including, but not limited to lights, turn signals, etc. As the AGVs 112 will be crossing public roads features that communicate to other driver vehicles are included in the AGVs 112.

In some embodiments, the AGVs 112 include sensor-based guidance systems. In some embodiments, the AGVs 112 include obstacle detection bumpers. In some embodiments, the AGVs 112 include a dispatch system. In some embodiments, the AGVs 112 include high-efficiency batteries and a charging system. In some embodiments, the AGVs 112 include real-time feedback system.

In some embodiments, the system 100 further includes an apparatus 200. The apparatus 200 is described more fully in conjunction with FIG. 2. The apparatus 200 may be configured through modules to implement the features of the system 100 and control, dispatch, and communicate with the AGVs 112. In addition, the apparatus 200 may be configured through modules to communicate through other computing devices 120. The computing devices 120 may be user mobile phones or other internet connected devices.

Figure 2:
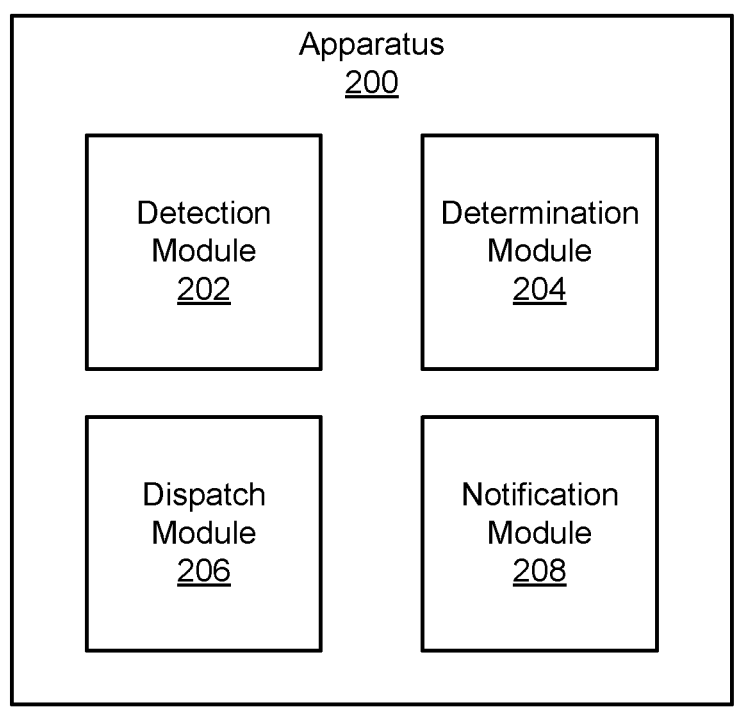
FIG. 2 is a schematic block diagram illustrating an apparatus in accordance with one or more embodiments of the present invention.

FIG. 2 is a schematic block diagram illustrating one embodiment of an apparatus 200 for dispatching AGVs in accordance with some embodiments of the present invention. The apparatus 200 includes a detection module 202, a determination module 204, a dispatch module 206, and a notification module 208, which are described below.

The apparatus 200 may be at least partially installed on the individual AGVs 112, or in a distributed network, or localized network or computing devices. The detection module 202 detects at least one rider at a pickup location. In various embodiments, the rider(s) may be detected in different ways including a combination of one or more ways described herein. In some embodiments, the detection module 202 detects riders at a pickup location by detecting people at a pre-determined pickup location. In embodiments where the pickup locations are pre-determined (for example, in a mass transit application), the pickup locations may include sensors that detect potential riders. In some embodiments, the detection sensors are video sensors configured to perform image analysis. In some embodiments, the detection sensors are motion sensors. In an implementation, the motion sensors may activate another sensor such as the video sensor. In some embodiments, the detection sensors are proximity sensors. Various types of sensors including those described herein may automatically detect riders at the pickup location.

In some embodiments, the detection module 202 detects riders at a pickup location by receiving a user activated call or signal. In some embodiments, the pickup location may include a call button, lever, or actuator that calls and notifies of a request for an AGV 112 at the pickup location. In some embodiments, the user activates a mechanical actuator that automatically calls for an AGV 112. In some embodiments, the user may interface a kiosk or other electronic terminal.

In some embodiments, the pickup location is not pre-determined. In some embodiments, the detection module 202 detects riders at a pickup location by receiving a notification from the rider. In some embodiments, notification is provided by an instruction from a phone application (app) or internet application. That is, a user may indicate via a mobile phone or internet application a pickup location and further details including other constraints.

In some embodiments, the detection module 202 detects a number of passengers to be transported. The number of passengers may be detected in a manner similar to those outlined above and herein.

The apparatus 200 further includes a determination module 204. In some embodiments, the determination module 204 determines a qualifying automated guided vehicle (AGV) 112 of a fleet 110 of automated guided vehicles based on at least one of distance to the pickup location, passenger capacity, or vehicle type.

Determination of a qualifying AGV 112 may be accomplished in various ways. In some embodiments, the determination module 204 may cross check all automated guided vehicles in the fleet 110 to determine eligibility across all known constraints. For example, the determination module 204 may determine which AGVs 112 satisfy the passenger capacity constraint. The determination module 204 may further determine which of those AGVs 112 which satisfy the passenger capacity constraint also satisfy other constraints such as vehicle type.

In some embodiments, the determination module 204 may further rank the eligible AGVs 112 based on a hierarchy of constraints. In some embodiments, the hierarchy of constraints is predetermined. In some embodiments, the hierarchy of constraints is set by the user and communicated via an app or internet application. In some embodiments, the ranking of eligible AGVs 112 may be based on proximity to the pickup location. In some embodiments, the ranking of eligible AGVs 112 is based solely on distance or proximity of the AGVs 112 to the pickup location. That is, regardless of whether an AGV 112 includes a passenger capacity greater than what is needed, the closest AGV 112 will be ranked first.

In some embodiments, ranking the eligible AGVs 112 may be done by a predetermined formula. For example, an AGV 112 with a passenger capacity closer to the determined need may be rated higher than another AGV 112 with a greater passenger capacity. In some embodiments, the predetermined formula may weight certain characteristics to determine and provide more weight to one or more of the constraints. As an example, a combination of distance to the pickup location along with how the AGVs satisfy the other known constraints can determine a score that ranks the AGVs 112.

In some embodiments, the determination module 204 may rank the AGVs 112 based on external conditions. For example, when inclement weather is present, the determination module 204 may rank proximity as the sole or most important constraint. To reduce the amount of time a user is waiting for the AGV 112 in the inclement weather, the closest available AGV 112 is dispatched. Other external factors may affect the hierarchy of constraints or the formula for determining a ranking.

In some embodiments, the determination module 204 further determines a plurality of routes available from the pickup location to a destination location. In some embodiments, the routes have road sensors embedded in the plurality of routes. After determining the pickup location and the destination location, a plurality of routes including sensors to guide the AGVs 112 may be determined. As discussed earlier, the AGVs 112 may utilize various markers, wires, lasers, magnets, etc. to function as sensors and provide guided navigation. In some embodiments, each AGV 112 may have a single predetermined route that the AGV 112 follows on surface streets etc. In some embodiments, riders may go to any point on the route and indicate a need for transportation.

In some embodiments, the AGVs 112 may have multiple routes that the AGVs 112 could follow which provide a plurality of routes available to navigate from a pickup location to a destination location. In some embodiments, the determination module 204 may determine all potential routes available.

The apparatus 200 further includes a dispatch module 206. In some embodiments, the dispatch module 206 dispatches the qualifying automated guided vehicle 112 of the fleet 110 of automated guided vehicles in response to the detection module 202 detecting the at least one rider at the pickup location. In some embodiments, the dispatch module 206 dispatches one of a plurality qualifying automated guided vehicle of the fleet of automated guided vehicles in response to the detection module 202 detecting the at least one rider at the pickup location.

In some embodiments, the dispatch module 206 dispatches the qualifying automated guided vehicle 112 of the fleet 110 of automated guided vehicles in response to the determination module 204 determining a qualifying automated guided vehicle (AGV) 112 of a fleet 110 of automated guided vehicles based on at least one of distance to the pickup location, passenger capacity, or vehicle type. In some embodiments, the dispatch module 206 dispatches the qualifying automated guided vehicle 112 of the fleet 110 of automated guided vehicles in response to the detection module 202 detecting the at least one rider at the pickup location and in response to the determination module 204 determining a qualifying automated guided vehicle (AGV) 112 of a fleet 110 of automated guided vehicles based on at least one of distance to the pickup location, passenger capacity, or vehicle type.

In some embodiments, the dispatch module 206 dispatches the closest qualifying automated guided vehicle 112 of the fleet 110 of automated guided vehicles. In some embodiments, the dispatch module 206 dispatches the highest ranking automated guided vehicle 112 of the fleet 110 of automated guided vehicles based on the ranking of the determination module 204.

The apparatus 200 further includes a notification module 208. In some embodiments, the notification module 208 notifies of delivery of the at least one rider to a destination location.

In some embodiments, the AGV 112 is removed from availability while delivering the at least one rider to the destination location. That is, if the detection module 202 detects other riders at a different location, the AGV 112 will not be available and the determination module 204 will not determine that the AGV 112 is a qualifying AGV 112 for the new request. In some embodiments, the notification module 208 further notifies of a service availability of the qualifying automated guided vehicle in response to delivery of the at least one rider to the destination location.

In some embodiments, an AGV 112 is not removed from availability while delivering the at least one rider to a destination location. That is, the AGV 112 may be available to satisfy new requests if the determination module 204 determines that the AGV 112 is a qualifying AGV. The AGV 112 would then further pick up the passengers for the new request while on route to delivering the existing at least one rider to the destination location.

The notification module 208 may further be configured to notify of other changes in state of the AGVs 112. In some embodiments, the notification module 208 further notifies of a service unavailability of the automated guided vehicle 112. The service unavailability may be in response to a low battery state of the automated guided vehicle 112 or some other reason. In some embodiments, service unavailability may be determined when passenger capacity is full. For example, the notification module 208 may notify that no seats are open on the AGV.

Figure 3:
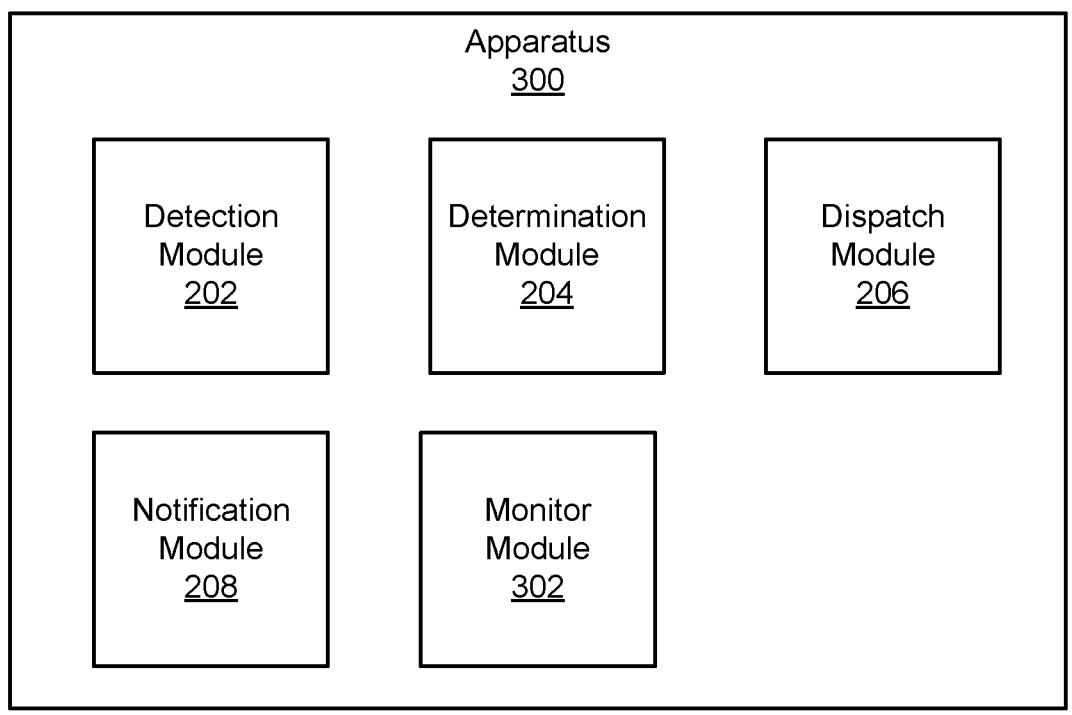
FIG. 3 is a schematic block diagram illustrating another apparatus in accordance with one or more embodiments of the present invention.

FIG. 3 is a schematic block diagram illustrating another embodiment of an apparatus 300 in accordance with one or more embodiments of the present invention. The apparatus 300 includes a detection module 202, a determination module 204, a dispatch module 206, and a notification module 208, which are substantially similar to those described above in relation to the apparatus 200 in FIG. 2. The apparatus 300 also includes a monitor module 302, which is described below.

In some embodiments, the monitor module 302 monitors a service availability of each automated guided vehicle 112 of the fleet 110 of automated guided vehicles. As discussed above, the AGVs 112 may be determined as available or unavailable for many different reasons. The monitor module 302 monitors the service availability of the AGVs 112. In some embodiments, the monitor module 302 continually monitors the AGVs 112. In some embodiments, the monitor module 302 asynchronously monitors the AGVs 112.

In some embodiments, the monitor module 302 monitors a current location of each automated guided vehicle 112 of the fleet 110 of automated guided vehicles. As the AGVs 112 are dispatched in various locations, the monitor module 302 may monitor the current location of the AGVs 112 to better allow for determination of which AGV 112 may be closest to a pickup location.

Figure 4:
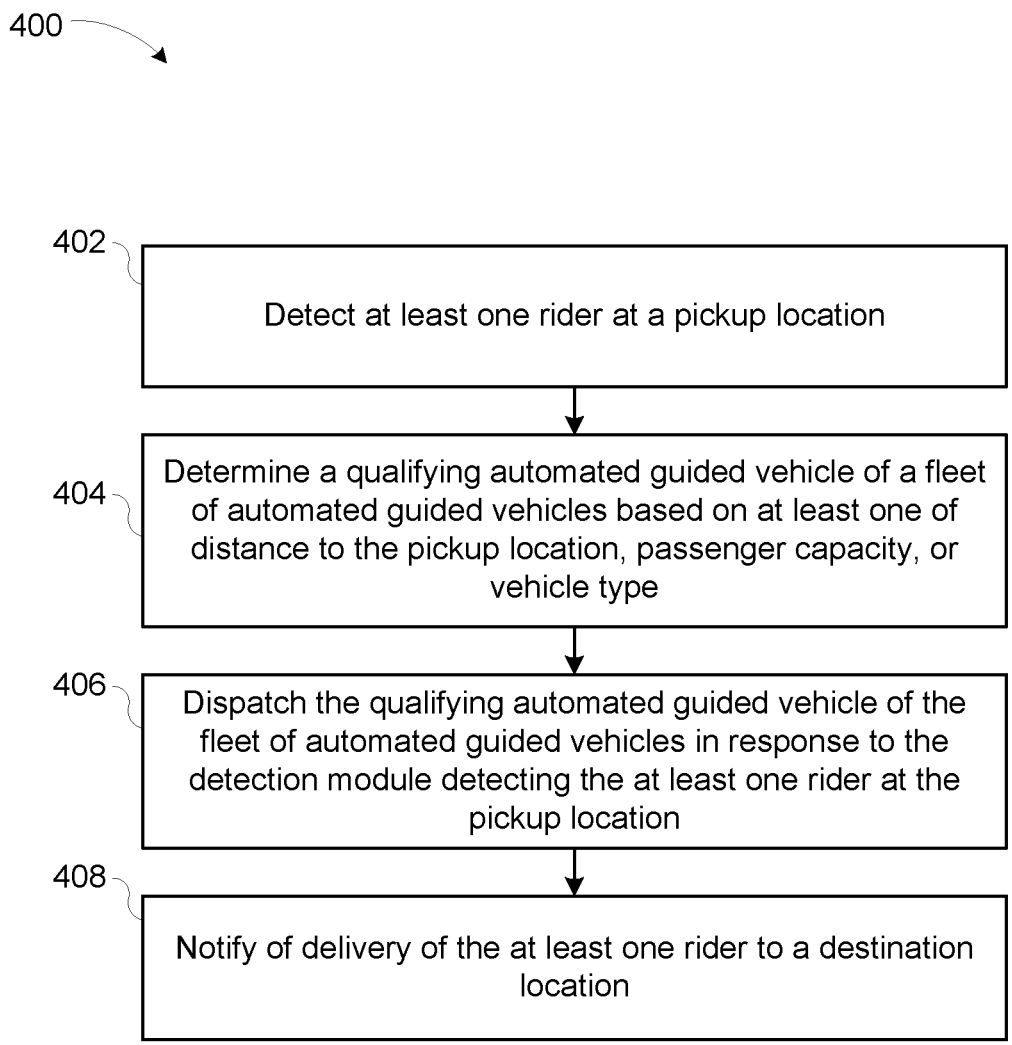
FIG. 4 is a schematic flow chart diagram illustrating one embodiment of a method in accordance with one or more embodiments of the present invention.

FIG. 4 is a schematic flow chart diagram illustrating one embodiment of a method 400 in accordance with the present invention. At block 402, the method 400 includes detecting at least one rider at a pickup location. At block 404, the method 400 includes determining a qualifying automated guided vehicle of a fleet of automated guided vehicles based on at least one of distance to the pickup location, passenger capacity, or vehicle type. At block 406, the method 400 includes dispatching the qualifying automated guided vehicle of the fleet of automated guided vehicles in response to the detection module detecting the at least one rider at the pickup location. At block 408, the method 400 includes notifying of delivery of the at least one rider to a destination location.

In some embodiments, the fleet of automated guided vehicles comprises a plurality of automated guided vehicles with different passenger capacities and vehicle types. In some embodiments, the method further includes monitoring a service availability of each automated guided vehicle of the fleet of automated guided vehicles and a current location of each automated guided vehicle of the fleet of automated guided vehicles. In some embodiments, the method further includes notifying of a service availability of the qualifying automated guided vehicle in response to delivery of the at least one rider to the destination location. In some embodiments, the method further includes notifying of a service unavailability of the qualifying automated guided vehicle in response to a low battery state of the qualifying automated guided vehicle.

In some embodiments, the method further includes determining a plurality of routes available from the pickup location to a destination location, and wherein the routes have road sensors embedded in the plurality of routes. In some embodiments, the method further includes detecting a number of passengers to be transported by one of video monitoring, automatic detection, or notification of the rider.

Figure 5:
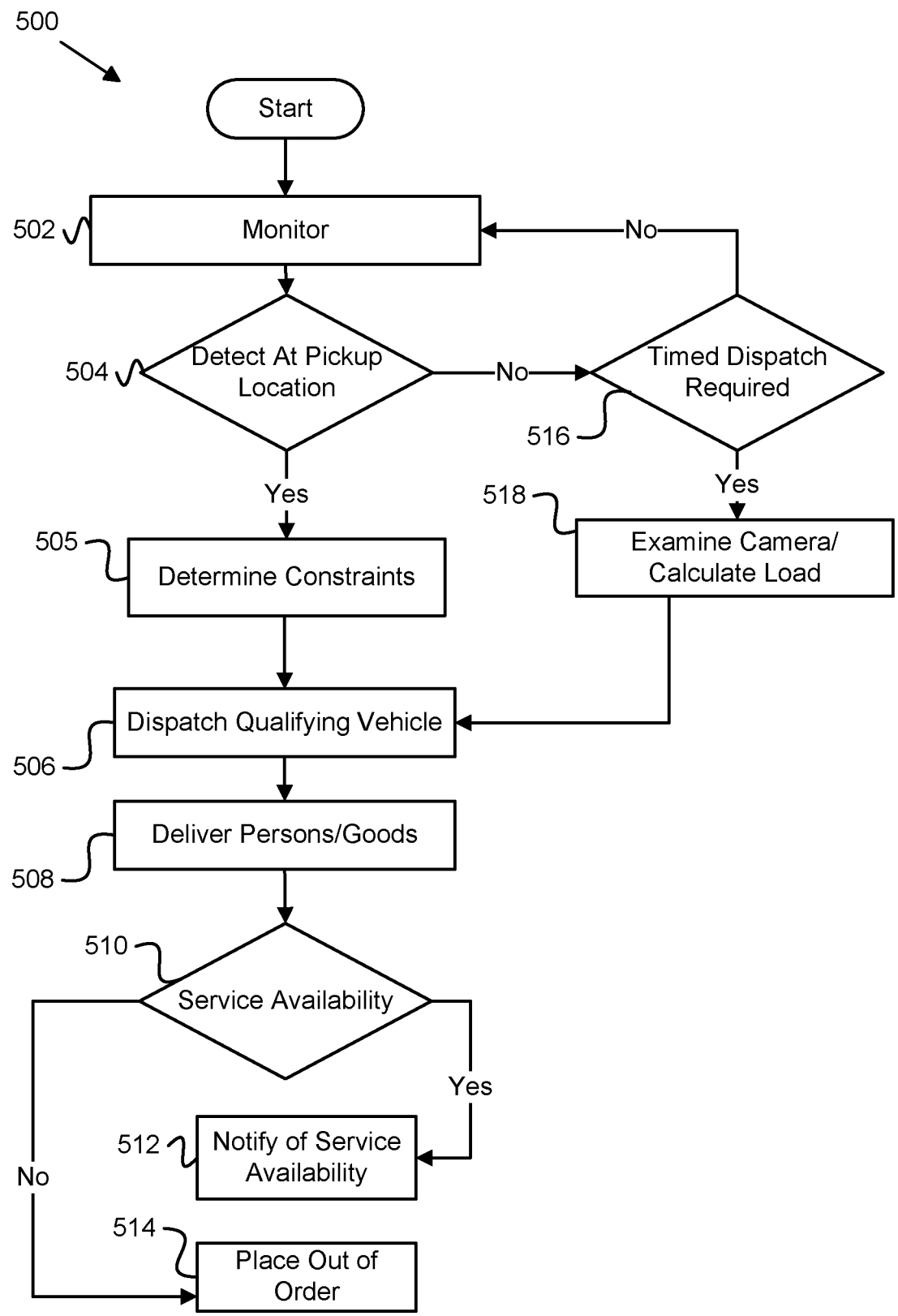
FIG. 5 is a schematic flow chart diagram illustrating another embodiment of a method in accordance with one or more embodiments of the present invention.

FIG. 5 is a schematic flow chart diagram illustrating another embodiment of a method 500 for dispatching automated guided vehicles in accordance with one or more embodiments of the present invention. The method 500 begins and at 502, the AGVs 112 are monitored. All types of constraints may be monitored. When not in use the AGVs 112 may be charging their batteries or receiving other maintenance. At 504, it is checked whether there are users at a pickup location. In no users are detected then the method 500 proceeds to block 516. If users are detected, then constraints are determined at 505. Constraints may be independently determined or input by the users. Before an AGV is dispatched a camera may be used to determine how many people need to be picked up. Calculations may then be performed to determine the minimum size AGV that can comfortably hold that number of people taking into consideration space for wheel chairs, strollers, and any baggage. When the space requirements have been computed the system may then dispatch, at 506, the closest available vehicle meeting the size requirements is dispatched.

At 508, the users and goods are delivered to a destination location. This destination may have been selected via web application, preselected by the software or selected by some over method such as a display screen inside the vehicle with possible destinations.

After delivery, at 510 a check is made to determine if the vehicle is fully functional. Fully functional vehicles will have enough charge to travel to any destination, pick up passengers and deliver them to any location. Vehicles not meeting this requirement will report themselves out of service. If service availability is determined, at 512 a dispatcher is notified that the AGV is available and the AGV goes back to monitoring state. If service unavailability is determined, at 514 the AGV is placed out of order until the AGV can remedy the condition that triggered the service unavailability. For example, service unavailability may be because of low battery or another abnormality of the AGV.

Returning to block 516, a check is made to determine if it is time to pick up people at a predetermined pickup location. This may be a prescheduled pickup or a regularly scheduled pickup time, for example, every half hour. At 518, before an AGV is dispatched a camera may be used to determine how many people need to be picked up. Calculations are then performed to determine the minimum size vehicle that can comfortably hold that number of people taking into consideration space for wheel chairs, strollers, and any baggage. When the space requirements have been computed the system may then dispatch the closest available AGV meeting the size requirements or other determined constraints as the process returns to block 506 and proceeds as described above.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a detection module that determines, via a sensor at a pickup location, a quantity of riders at the pickup location for transport by an automated guided vehicle;
   a determination module that determines a qualifying automated guided vehicle of a fleet of automated guided vehicles based on the determined quantity of riders at the pickup location;
   a dispatch module that dispatches the qualifying automated guided vehicle to the pickup location in response to determining that the qualifying automated guided vehicle is available to transport the quantity of riders; and
   a notification module that notifies of delivery of the quantity of riders to a destination location,
   wherein at least a portion of said modules comprises one or more of a set of hardware circuits, a set of programmable hardware devices, and executable code stored on a set of non-transitory computer-readable storage media.

2. The apparatus of claim 1, further comprising a monitor module that monitors a service availability of each automated guided vehicle of the fleet of automated guided vehicles.

3. The apparatus of claim 1, further comprising a monitor module that monitors a current location of each automated guided vehicle of the fleet of automated guided vehicles.

4. The apparatus of claim 1, wherein the fleet of automated guided vehicles comprises a plurality of automated guided vehicles with different passenger capacities and vehicle types.

5. The apparatus of claim 1, wherein the notification module further notifies of a service availability of the qualifying automated guided vehicle in response to delivery of the quantity of riders to the destination location.

6. The apparatus of claim 1, wherein the notification module further notifies of a service unavailability of the qualifying automated guided vehicle in response to a low battery state of the qualifying automated guided vehicle.

7. The apparatus of claim 1, wherein:
   the determination module further determines a plurality of routes available from the pickup location to the destination location; and
   the plurality of routes include road sensors embedded in each of the plurality of routes.

8. The apparatus of claim 1, wherein the sensor comprises one or more of a video sensor, a motion sensor, and a proximity sensor.

9. The apparatus of claim 1, wherein:
   the pickup location includes a designated area; and
   the detection module further detects the quantity of riders by activation of a call button located at the designated area.

10. The apparatus of claim 1, wherein:
    the detection module further detects the quantity of riders by receiving a notification from a rider; and
    the notification identifies the pickup location.

11. The apparatus of claim 1, wherein:
    The sensor comprises a video sensor;
    the pickup location includes a designated area; and
    the detection module utilizes the video sensor to determine the quantity of riders via video monitoring the designated area.

12. A method comprising:
    determining, via a sensor at a pickup location, a quantity of riders at the pickup location for transport by an automated guided vehicle;
    determining a qualifying automated guided vehicle of a fleet of automated guided vehicles based on the determined quantity of riders at the pickup location;
    dispatching the qualifying automated guided vehicle to the pickup location in response to determining that the qualifying automated guided vehicle is available to transport the quantity of riders; and generating a notification that indicates delivery of the quantity of riders to a destination location.

13. The method of claim 12, further comprising monitoring a service availability of each automated guided vehicle of the fleet of automated guided vehicles and a current location of each automated guided vehicle of the fleet of automated guided vehicles.

14. The method of claim 12, wherein the fleet of automated guided vehicles comprises a plurality of automated guided vehicles with different passenger capacities and vehicle types.

15. The method of claim 12, further comprising notifying of a service availability of the qualifying automated guided vehicle in response to delivery of the quantity of riders to the destination location.

16. The method of claim 12, further comprising notifying of a service unavailability of the qualifying automated guided vehicle in response to a low battery state of the qualifying automated guided vehicle.

17. The method of claim 12, further comprising:

determining a plurality of routes available from the pickup location to the destination location, wherein the plurality of routes include road sensors embedded in each of the plurality of routes.

18. The method of claim 12, wherein the sensor comprises one or more of a video sensor, a motion sensor, and a proximity sensor.

19. A computer program product comprising a computer-readable storage medium including program instructions embodied therewith, the program instructions executable by a processor to cause the processor to:

determine, via a sensor at a pickup location, a quantity of riders at the pickup location for transport by an automated guided vehicle;

determine a qualifying automated guided vehicle of a fleet of automated guided vehicles based on the determined quantity of riders at the pickup location;

dispatch the qualifying automated guided vehicle to the pickup location in response to determining that the qualifying automated guided vehicle is available to transport the quantity of riders; and generate a notification that indicates delivery of the quantity of riders to a destination location.

20. The computer program product of claim 19, the program instructions further causing the processor to notify of a service unavailability of the qualifying automated guided vehicle in response to a low battery state of the qualifying automated guided vehicle.

* * * * *